United States Patent [19]
Serizawa et al.

[11] Patent Number: 6,092,859
[45] Date of Patent: Jul. 25, 2000

[54] ARRANGEMENT STRUCTURE OF DOOR HARNESS FOR VEHICLE

[75] Inventors: Yasuyoshi Serizawa; Takahiko Suzuki, both of Shizuoka, Japan

[73] Assignee: Yazaki Corporation, Tokyo, Japan

[21] Appl. No.: 09/268,705

[22] Filed: Mar. 16, 1999

[30] Foreign Application Priority Data

Mar. 18, 1998 [JP] Japan ................................. 10-068681

[51] Int. Cl.[7] ...................................................... B60J 5/04
[52] U.S. Cl. ........................................................ 296/146.7
[58] Field of Search .............................. 296/152, 146.7, 296/146.12

[56] References Cited

U.S. PATENT DOCUMENTS

| | | | |
|---|---|---|---|
| 4,815,984 | 3/1989 | Sugiyama et al. ................. | 296/146.7 |
| 4,862,011 | 8/1989 | Wright .............................. | 296/152 |
| 4,907,836 | 3/1990 | Ueda et al. ....................... | 296/146.7 |
| 5,092,647 | 3/1992 | Ueda et al. ....................... | 296/152 |
| 5,584,144 | 12/1996 | Hisano ............................. | 296/146.7 |
| 5,879,047 | 3/1999 | Yamaguchi et al. .............. | 296/146.7 |
| 5,884,961 | 3/1999 | Serizawa et al. ................. | 296/146.7 |
| 5,897,157 | 4/1999 | Yamaguchi et al. .............. | 296/146.7 |

*Primary Examiner*—Gary C. Hoge
*Attorney, Agent, or Firm*—Armstrong, Westerman, Hattori, McLeland & Naughton

[57] ABSTRACT

In an arrangement of a door harness for a vehicle, a slide guide is arranged within a vehicle door, a harness protector is slidably fit in the slide guide, a door harness is introduced from the one end of the harness protector, and a body harness extending from a vehicle body is coupled with the door harness. In such a configuration, the harness protector is formed of soft resin and is secured to a front pillar of the vehicle body through a protector holder. Thus, when the door is opened or closed, the harness protector itself bends. Therefore, the door harness for a vehicle can be easily arranged in such a manner that an uneven spot is not provided for the vehicle body, a door trim and an inner panel.

7 Claims, 7 Drawing Sheets

ARRANGEMENT STRUCTURE OF DOOR HARNESS FOR VEHICLE

BACKGROUND OF THE INVENTION

1. Field of the Invention

The present invention relates to an arrangement structure of a door harness for a vehicle, which is used to arrange a wire harness between a vehicle door and a vehicle body.

2. Description of the Related Art

Figure 7:
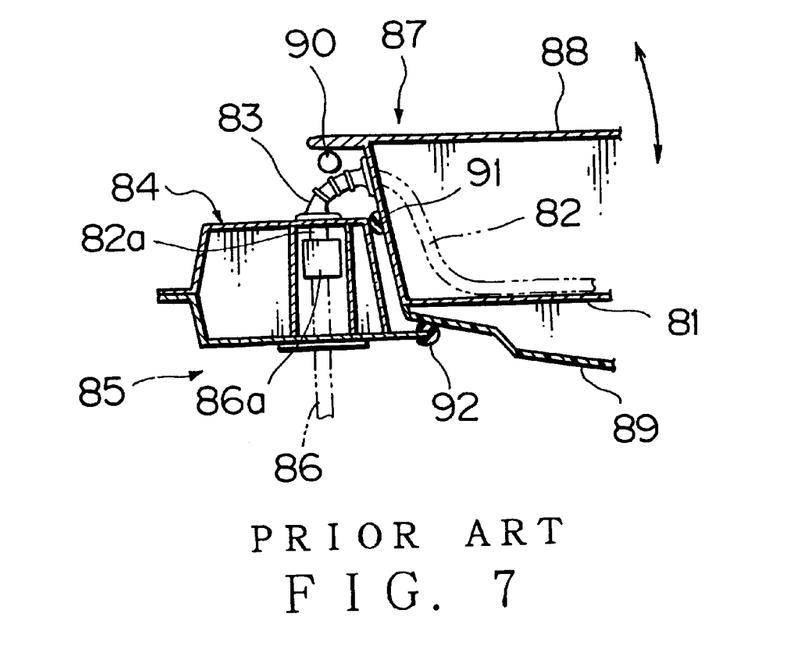
FIG. 7 is a view showing a prior art.

Generally, the door harness for a vehicle has an arrangement structure as shown in FIG. 7. Specifically, in an inner panel 81, a door side wire harness (simply referred to as "door harness") 82 is arranged on its outer panel side. The one end of the door harness 82 is connected to an auxiliary machine (not shown) whereas the other end thereof is inserted into a front pillar 84 through a grommet 83. A body side wire harness (simply referred to as "body harness") 86 arranged within a vehicle body 85 is introduced into the front pillar 84. Within the front pillar 84, a door side connector 82a of the door harness 82 is electrically coupled with a body side connector 86a of the body side connector 86.

A vehicle door 87 (hereinafter referred to as simply "door") is composed of an outer panel 88 and an inner panel 81 which are integrated to each other and a door trim 89 attached to the inner panel 81. The door 87 is rotatably attached to the body 85 through a door hinge 90. Between the door 87 and the front pillar 84 of the body 85, a first and a second door weather strip (hereinafter referred to as "weather strip") 91 and 92 are arranged.

The above arrangement structure has a disadvantage that when the door 87 is opened or closed, the grommet 83 of rubber is forcibly bent and the door harness 82 is also pulled so that the grommet 83 itself may be injured and door harness 82 may cause poor electric conduction.

In order to prevent the poor electric conduction of the door harness 82, the following arrangement structure of the door harness 82 has been proposed.

Figure 8:
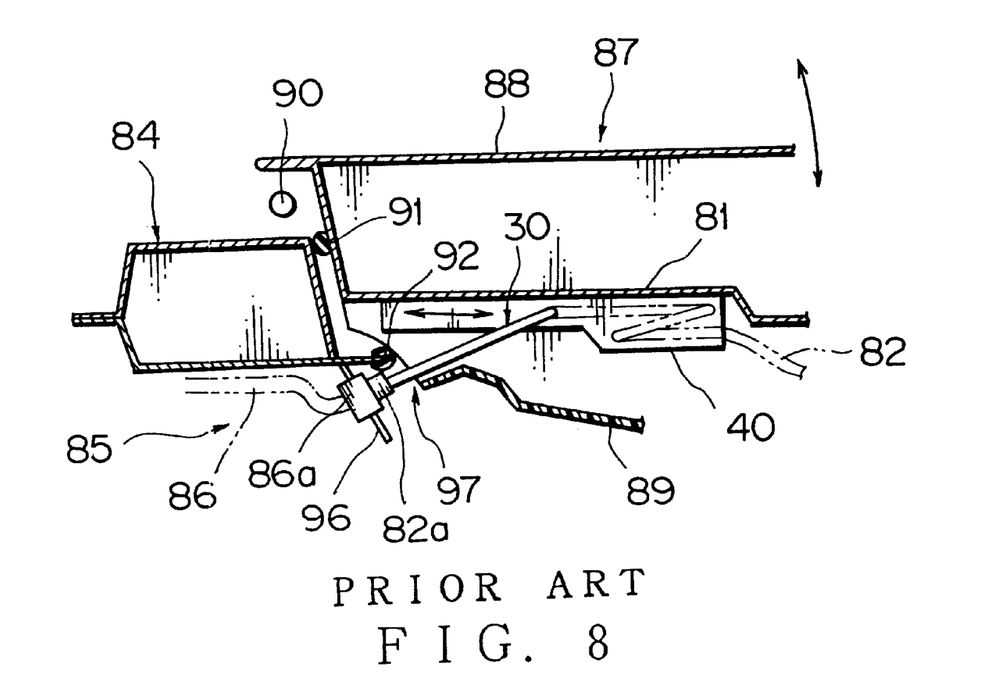
FIG. 8 is a view showing another prior art.
Figure 9:
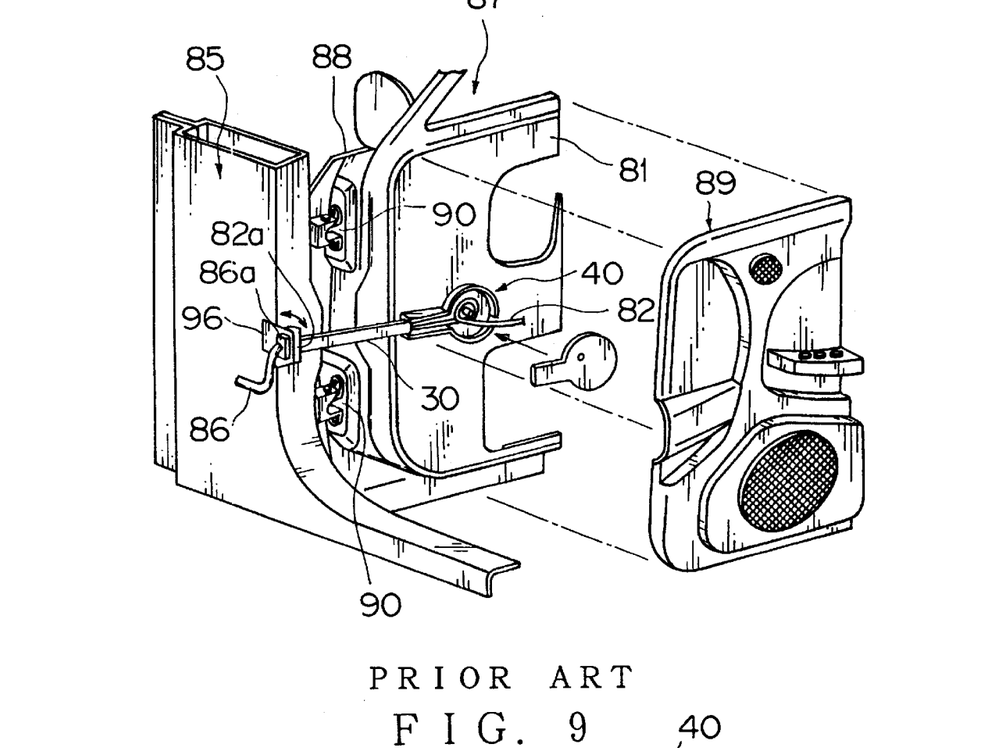
FIG. 9 is a perspective view of FIG. 8.
Figure 10:
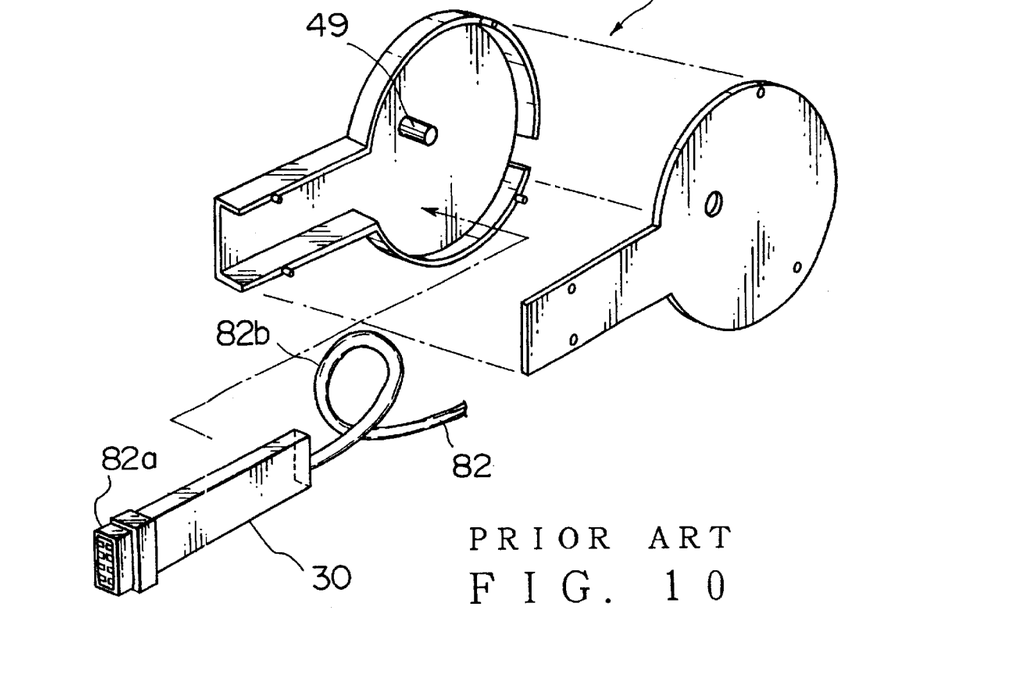
FIG. 10 is an exploded perspective view of the slide guide shown in FIG. 9.

In this arrangement structure, as shown in FIGS. 8 to 10, a slide guide 40 is attached to the inner panel 81 on the side of the door trim 89 and the door harness 82 is passed through a hard harness protector 30. The harness protector 30 is slidably accommodated within the slide guide 40. The door harness 82 is engaged with a harness supporting pin 49 within the slide guide 40 so that it makes a ring 82b. The body side connector 86a of the body side harness 86 is rotatably provided in the front pillar 84 through a bracket 96. The door connector 82a of the door harness 82 passed through the harness protector 30 is electrically coupled with the body side connector 86a.

In such a configuration, as the door 87 is opened or closed, the harness protector 30 can slide within the slide guide 40 so that the ring 82b of the door harness 82 increases or decreases its diameter, thus preventing the poor electric conduction of the door harness 82.

However, the configuration is made complicate since the harness protector 30 is hard and the body connector 86a (or bracket 96) is rotatably provided in the body 85. In addition, in order that the door connector 82a (or bracket 96) can rotate as the door 87 opens or closes, it requires a space for swing. For this reason, the door trim 89 or inner panel 81 requires an uneven spot 97 and hence becomes complicate in its shape. Further, the harness protector 30 must have a hole (not shown) of a relatively large diameter, through which the harness is to be passed.

SUMMARY OF THE INVENTION

An object of the present invention is to provide an arrangement structure of a door harness for a vehicle in which the door harness can be simply arranged with no provision of an uneven spot in a body and a door trim or inner panel.

In order to attain the above object, there is provided an arrangement structure of a door harness for a vehicle comprising; a slide guide arranged within a vehicle door, a harness protector of soft material which is slidably fit in the slide guide; a first wire harness extending from a vehicle door through the harness protector; a second wire harness extending from a vehicle body and to be coupled with the first wire harness; a protector holder for holding the harness protector, and a front pillar of the vehicle body to which the harness protector is attached through the protector holder. In this configuration, as the vehicle door is opened or closed, the harness protector itself bends and slides in the slide guide. Thus, it is not necessary to rotate the coupling portion of the body side harness and the door harness so that the arrangement structure of the door harness can be simplified.

Preferably, the arrangement structure of a door harness for a vehicle includes a connector block arranged within the front pillar, a first connector for the first wire harness; a second connector for the second wire harness, the first connector and the second connector being coupled with each other within the connector block. In this configuration, it is not necessary to provide a panel wall such as a door trim or instrument panel attached to an inner panel with a concave or convex portion. The design of the door trim or instrument panel cannot be hindered. The favorable appearance of the door trim or instrument panel from a driver can be assured.

Preferably, the arrangement structure of a door harness for a vehicle comprises a first and a second door weather strip arranged between the vehicle door and the vehicle body. The protector holder is located between the first and the second door weather strip. In this configuration, even when rain drops or mud is splashed on the vehicle body, the first weather strip prevents the rain drops or mud from invading the vehicle body. Therefore, the rain drops or mud is not directly splashed on the protector holder so that the flowing of the rain drop or mud to the protector holder can be reduced.

Preferably, in the arrangement structure of a door harness for a vehicle, the harness protector includes a protector body having a first hole through which the first wire harness passes, and guide walls which are formed at both sides of the harness protector body to extend in a direction of passing the first wire harness and have recesses formed at the one end thereof, respectively and the protector holder includes a holder body having a second hole through which the harness protector passes and protrusions which are formed on inner walls of the holder body and to be engaged with the recesses. In this configuration, engagement between the recess and protrusion permits the harness protector and protector holder to be secured to each other. Further, since the harness protector can be secured to the inside of the protector holder, the soft harness protector can be protected.

Preferably, in the arrangement structure of a door harness for a vehicle, the protector holder includes a flange swelled on the side of the harness protector of the protector holder and having a guide hole for guiding the first wire harness to the second hole; locking arms for locking the front pillar, which are formed on both sides of the holder body; a water-proofing lip formed on the side of the holder body of the periphery of the flange; and a first water-proofing wall uprighted on the periphery of the guide hole. In this configuration, the first water-proofing wall and water-proofing lip prevents the rain drops, which have flowed down via the front pillar from the door when the door is opened, from invading the inside of the front pillar. This prevents poor electric conduction between the first harness and the second harness owing to invasion of the rain drops in the front pillar, thereby enhancing the reliability of the arrangement structure of the door harness.

Preferably, in the arrangement structure of a door harness for a vehicle, the flange have drawing holes for drawing the locking arms, and second water-proofing walls uprighted from the flange of the periphery of each of the drawing holes. In this configuration, the second water-proofing walls prevent the rain drops from intruding from the front pillar into the drawing holes. This prevents poor electric conduction between the first wire harness and the second wire harness owing to invasion of the rain drops in the front pillar, thereby enhancing the reliability of the arrangement structure of the door harness.

Preferably, in the arrangement structure of a door harness for a vehicle, the water-proofing lip, the first and second water-proofing walls are formed integrally to the flange. In this configuration, the flange can be easily provided.

The above and other objects and features of the present invention will become more apparent from the following description taken in conjunction with the accompanying drawings.

DESCRIPTION OF THE PREFERRED EMBODIMENTS

Now, referring to drawings, an explanation will be given of embodiments of the present invention.

FIGS. 1 to 6 show an embodiment of an arrangement structure of a door harness for a vehicle according to the present invention. It should be noted that in the embodiments of the present invention, like reference numerals refer to like parts in the prior arts.

Figure 1:
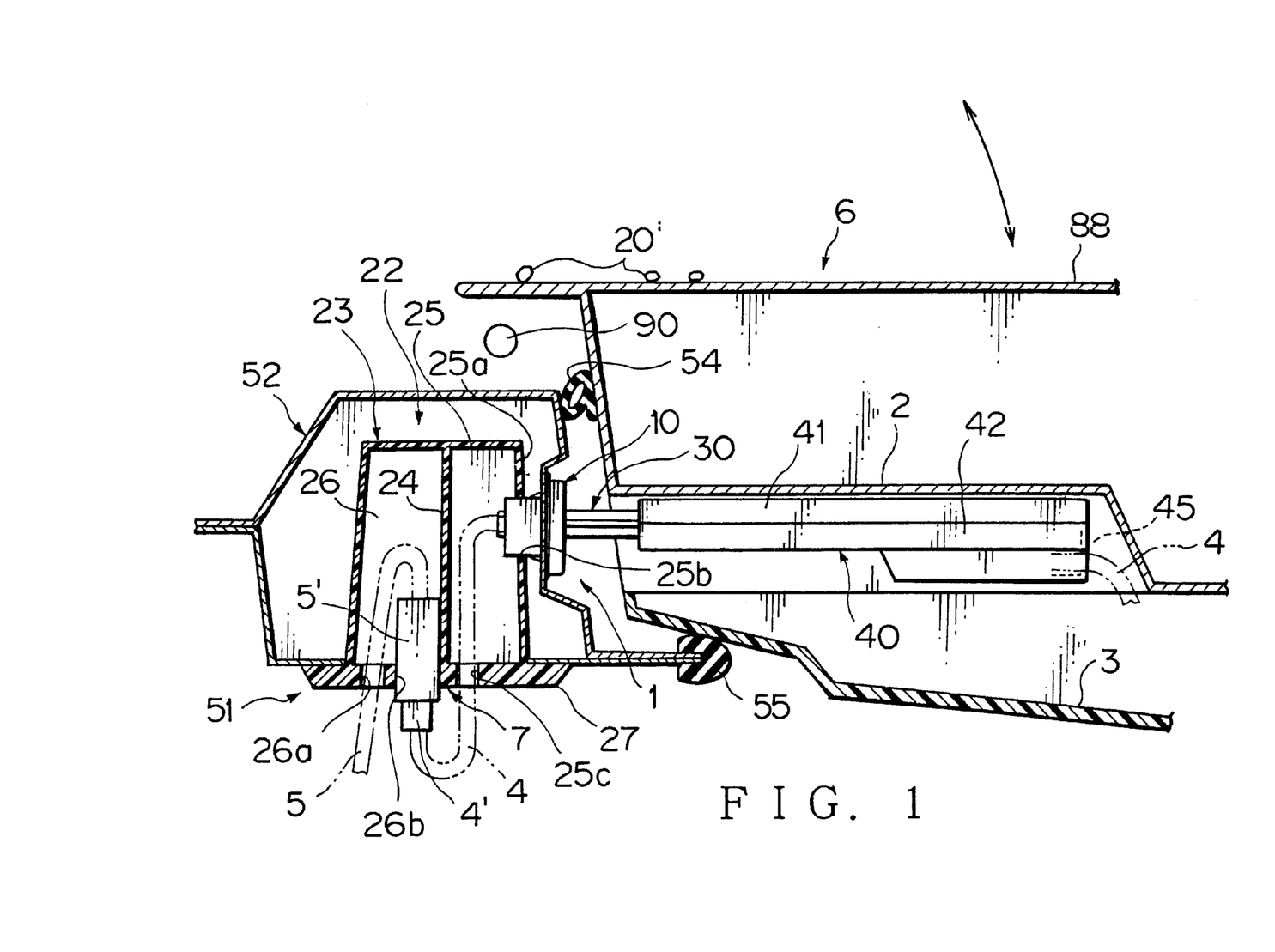
FIG. 1 is a schematic diagram of one embodiment of an arrangement structure of a door harness for a vehicle according to the present invention.

In an arrangement structure 1 shown in FIG. 1, a slide guide 40 is secured to an inner panel 2 on the side of a door trim 3. A soft harness protector 30 is fit in the slide guide 40. A door harness 4 arranged in the inner panel 2 is passed through the slide guide 40 and harness protector 30, and arranged in the front pillar 52 of a body 51 through a soft protector holder 10. In the front pillar 52, the door harness 4 is electrically coupled with a body side harness 5.

The harness protector 30 is formed of a soft resin material with excellent bending property such as polyester elastmer or 11-nylon. The harness protector 30 can bend when the door 6 is opened or closed (in the direction of an arrow in FIG. 1).

Figure 2:
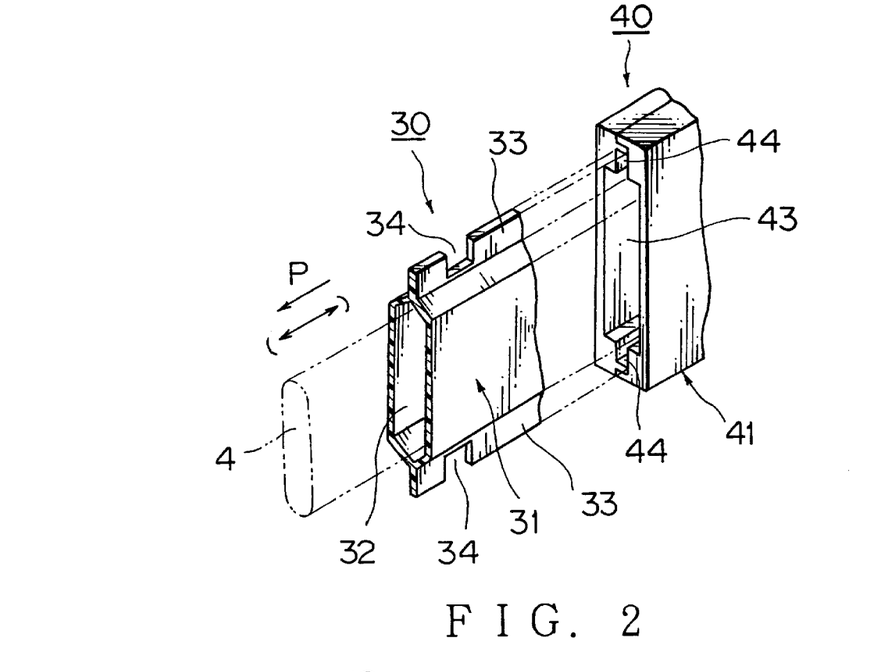
FIG. 2 is a perspective view of the harness protector and the slide guide shown in FIG. 1.
Figure 3:
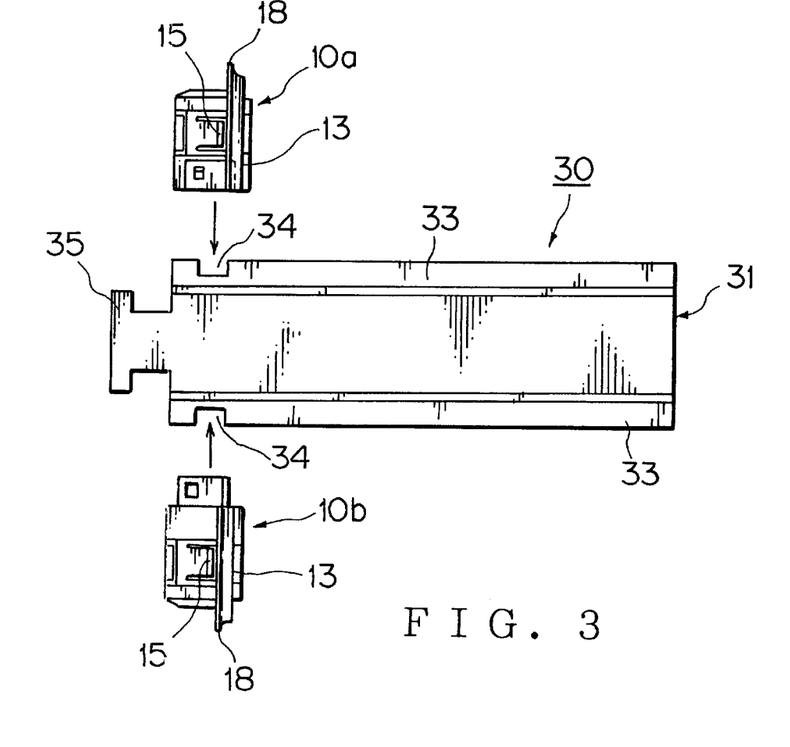
FIG. 3 is a schematic diagram of the harness protector and protector holder.

The harness protector 30 is structured as seen from FIGS. 1 to 3, particularly FIG. 2. Specifically, a through-hole 32 through which the door harness 4 is passed is formed in a protector body 31 having a sectional longitudinal hexagonal shape. The protector body 31 has an upper and lower guide wall 33. A recess 34 is formed on each guide wall 33 on the side of the front pillar 52. A harness securing portion 35 is formed at the end of the protector body 31. The guide wall 33 extends in a direction P of passing the door harness. The protector body 31 may have any sectional shape as long as it corresponds to that of the door harness 4.

As shown in FIGS. 1 and 2, the slide guide 40 includes a protector accommodating portion 41 where the harness protector 30 is slidably accommodated and a harness accommodating portion 42 where the door harness 4 passing through the harness protector 30 is accommodated. These portions 41 and 42 are integrally coupled to each other. The protector accommodating portion 41 has a sectional square accommodating hole 43 for receiving the harness protector 30. Guide grooves 44 are formed on opposite inner walls of the accommodating hole 43 so that they conform to the guide walls 33, respectively. The harness accommodating portion 42 has a harness accommodating chamber (not shown) where the door harness 4 is arranged. Within the harness accommodating chamber, a supporting pin (not shown) on which the ring (not shown) of the door harness 4 is hooked is arranged. The harness accommodating portion 42 has an insertion inlet for introducing the door harness 4. Within the slide guide 40, the accommodating hole 43 and the harness accommodating chamber are communicated with each other. The accommodating hole 43 may have any other sectional shape than the square shape.

Figure 4:
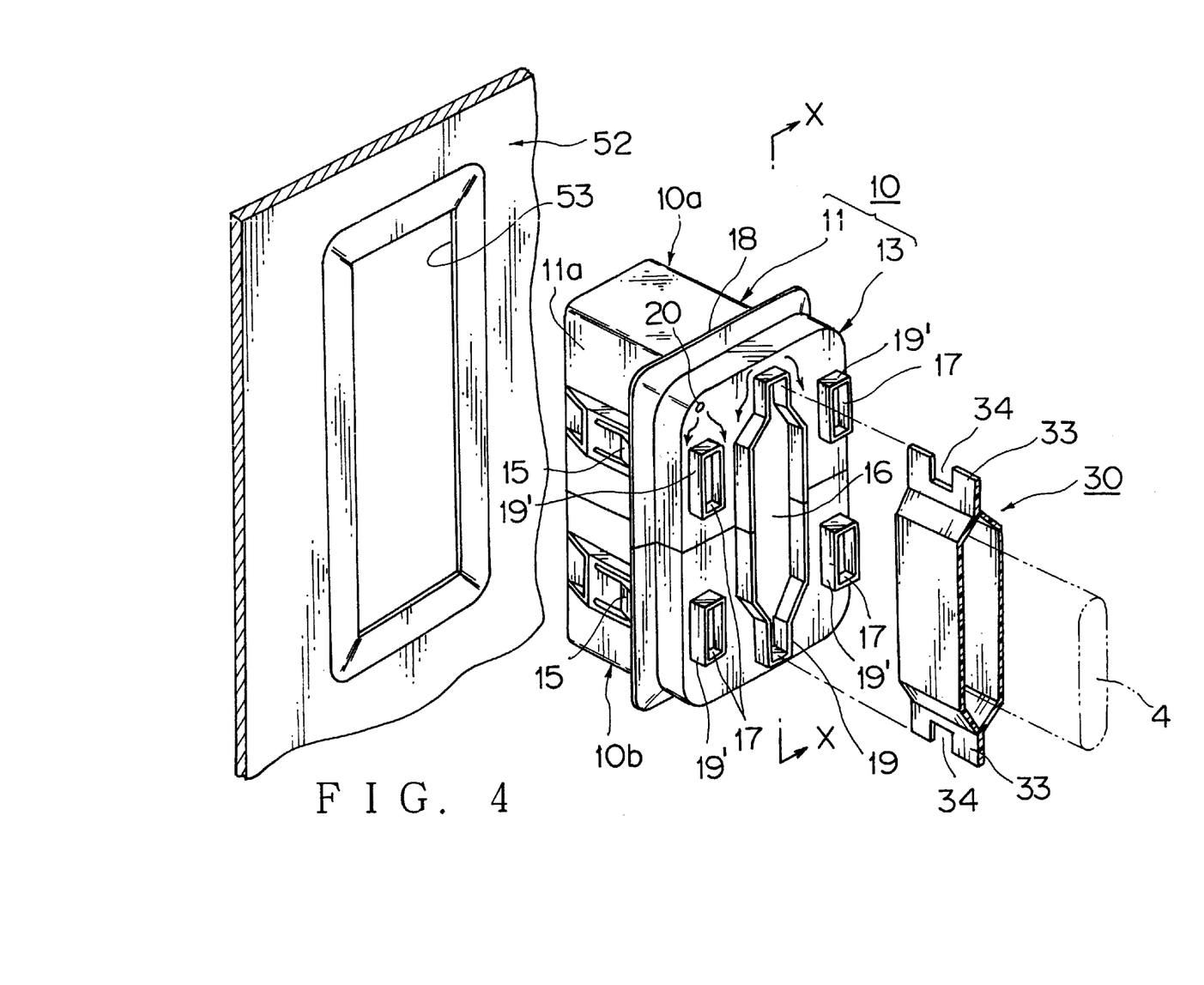
FIG. 4 is a perspective view of the protector holder in FIG. 1.
Figure 5:
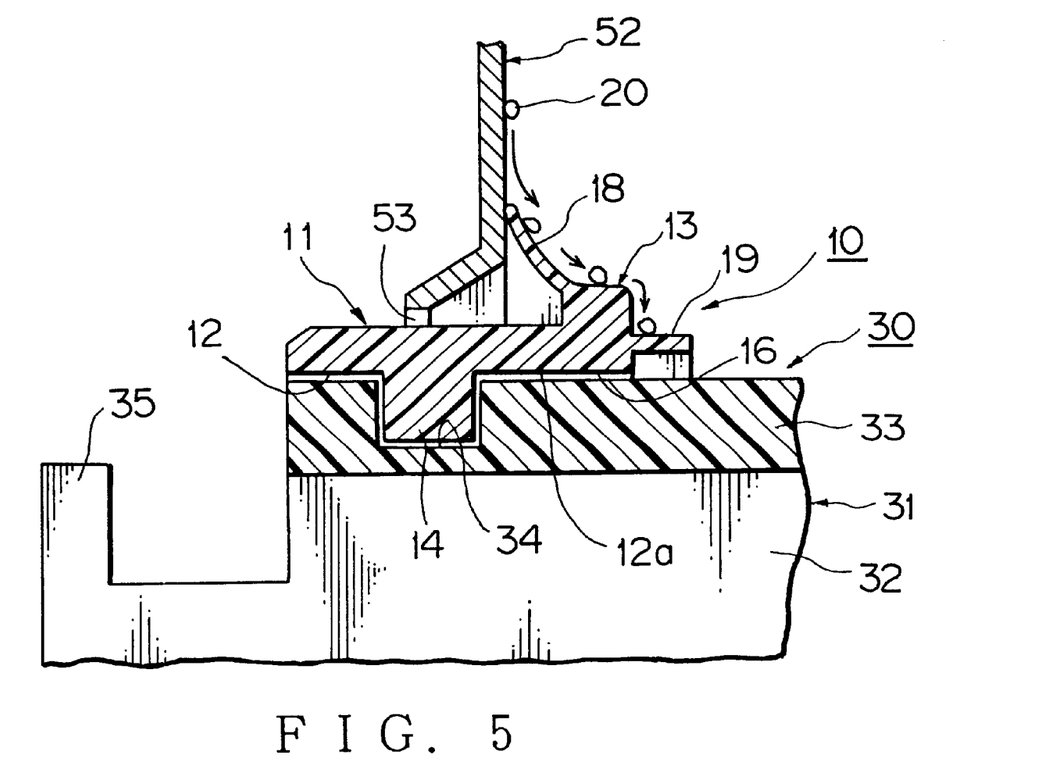
FIG. 5 is a sectional view of FIG. 4 taken in line X—X.

A protector holder 10 for holding the harness protector 30 is structured as seen from FIGS. 4 and 5. Specifically, the protector holder 10 includes a holder body 11 and a flange 13 swelled from the one end of the holder body 11. The holder body 11 is shaped in a hollow prism with a passing-through hole 12 into which the harness protector 30 is to be inserted. On the inner face of the passing-through hole 12, an engagement protrusion 14 abutting on a recess 34 of the guide wall 33 is formed. Locking arms 15 are uprighted from both side walls 11a of the holder body 11 so that they correspond to an attaching hole 53 of the front pillar 52. The flange 13 has an introducing hole 16 for introducing a harness protector 30 and drawing holes 17 for forming the locking arms 15. The number of the drawing holes is equal to that of the locking arms 15 (four in this embodiment). The protector holder 10 can be divided into two parts 10a and 10b as shown in FIG. 3.

Again referring to FIGS. 4 and 5, on the peripheral edge of the flange 13, a thin water-proofing lip 18 is extended on the side of the front pillar 52. On the periphery of the introducing hole 16 and each drawing hole 17, a first water-proofing wall 19 and second water-proofing wall 19' are formed. Because of such a configuration, when the protector holder 10 is assembled into the attaching hole 53 of the front pillar 52, the water-proofing lip 18 prevents rain drops 20 from invading the attaching hole 53. Further, even when the water drops 20 flowed down along the water-proofing lip 18 flows onto the flange 13, the first and second water-proofing walls 19 and 19' prevent the rain drops 20 from invading the introducing hole 16 and drawing hole 17.

Thus, the water-proofing lip 18 and first and second water-proofing walls 19, 19' assures simple water-proofing property of the protector holder 30. This prevents poor conduction of the door harness 4 and body-side harness 5 and poor water-proofing of the portion 7 of coupling both harnesses. Incidentally, the water-proofing lip 18 and first and second water-proofing walls 19, 19' can be integrated to the flange 13.

The front pillar 52 has a sectional concave attaching hole 53 used to assemble the protector holder 10 (FIG. 5). As seen from FIG. 1, within the front pillar 52, a connector block 22 is arranged. Between the periphery of the door 6 and the opening of the body 51, a first weather strip 54 and a second weather strip 55 are provided in order from the side of the door 6. The front pillar 52 is arranged between the first weather strip 54 and the second weather strip 55. Thus, the first weather strip 54 prevents the rain drops directly splashed on the door 6 while the vehicle is running from invading the body 51. In addition, the water-proofing lip 18 of the protector holder 10 and first and second water-proofing walls 19, 19' prevent the rain drops conveyed to the door 6 when the door 6 is opened or closed from invading the front pillar 52 through the protector holder 10.

The connector block 22 includes two chambers 25 and 26 which are formed by dividing the interior of the block body 23 by a partition 24. In the side wall 25a of the right chamber 25, an assembling hole 25b through which the protector holder 10 is passed is formed. In the bottom wall 27 thereof, a harness insertion hole 25c through which the door harness 4 is passed is formed. On the other hand, in the bottom wall 27 of the left chamber 26, a harness insertion hole 26a into which the door harness 5 is introduced is formed, and a connector insertion hole 26b is formed where the body side connector 5' of the body side harness 5 is secured. The body side harness 5 is passed through the harness insertion hole 26a and is circled once within the left chamber 26. The body side connector 5' is secured in the connector insertion hole 26b. The door harness 4 which extends from the protector holder 10 is passed through the harness insertion hole 25c, and the door side connector 4' is fit in the body side connector 5'.

An explanation will be given of a process of arranging the door harness 4 and the body side harness 5, respectively and connecting them to each other.

The door harness 4 is arranged as follows. As shown in FIG. 1, the slide guide 40 is attached to the inner panel 2. A ring of the door harness 4 made at the intermediate portion is hooked on the supporting pin. The tip of the door harness 4 is passed from the one end of the harness protector 30 to the other end thereof. The harness protector 30 is accommodated in the protector accommodating portion 41 of the slide guide 40. As seen from FIG. 5, the other end of the harness protector 30 is inserted into the introducing hole 16 and the through-hole 12 of the protector holder 10 so that the recess 34 and protrusion 14 are engaged with each other.

The protector holder 10 is inserted into the attaching hole 53 of the front pillar 52 so that the locking arms 15 are engaged with the peripheral edge of the attaching hole 53. Further, the tip of the door harness 4 is pulled out from the through-hole 12 of the protector holder 10 and is guided to the right chamber 25. It is further pulled out through the harness insertion hole 25c of the right chamber 25.

In this way, the door harness 4 is arranged within the door 6, and is further connected to the body side harness 5. Thereafter, the door trim 3 is coupled with the inner panel 2. Therefore, without providing the door trim 3 and inner panel 2 with an uneven spot, the door harness 4 is electrically connected with the body side connector 5. For this reason, in comparison to the prior art, the design of the door trim 3 and inner panel is not deteriorated, and appears beautiful.

An explanation will be given of the operation when the door 6 is opened/closed.

The body side harness 5 will be arranged as follows. As shown in FIG. 1, the tip of the body side harness 5 is passed through the harness insertion hole 26a of the left chamber 26. The body side harness 5 is passed through the harness insertion hole 26a and is circled once within the left chamber 26. The body side connector 5' of the body side harness 5 is secured into the connector insertion hole 26b. The door side connector 4' is coupled with the body side connector 5'. Thereafter, the door trim 3 is attached to the inner panel 2. Thus, the door 6 is completed.

Figure 6:
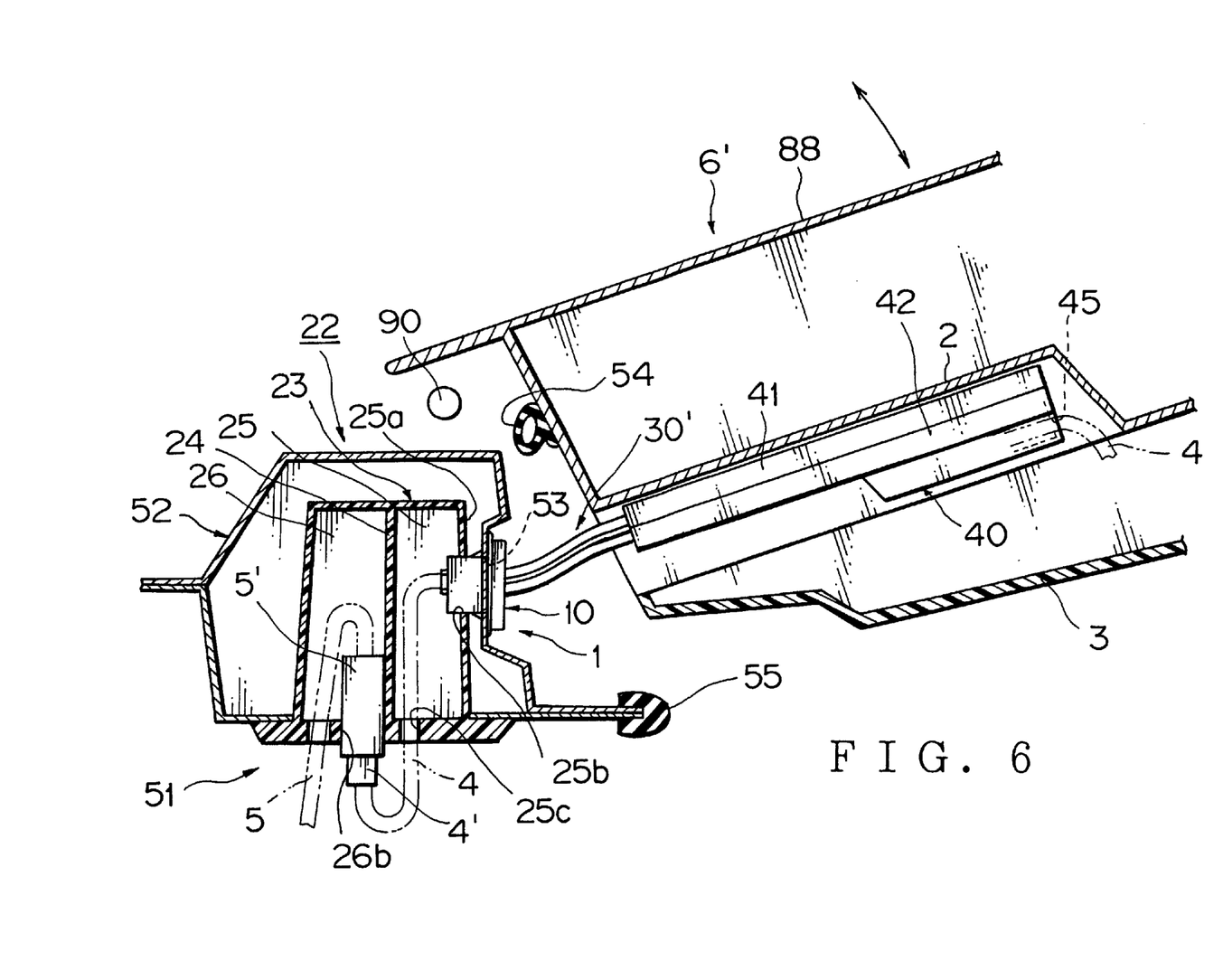
FIG. 6 is a view showing a state where a door is opened in FIG. 1.

When the door 6 thus fabricated is opened as shown in FIG. 6 (the door in an open state is denoted by reference numeral 6'), the harness protector 30 extends to follow the opening degree (the harness protector in an extended state is denoted by reference numeral 30') and also slides within the slide guide 40 so that the diameter of the ring of the door harness 4 will be reduced. As the door 6' in an open state is closed, as shown in FIG. 1, the diameter of the ring of the door harness is correspondingly enlarged. At this time, the harness protector 30', while it shrinks, slides within the slide guide 40. In this way, in contrast the prior art as show in FIG. 8 in which the door side connector 82a and body side connector 86a are rotated as the door 87 is opened or closed, in the present invention, the harness protector 30 itself is bent, thereby simplifying the arrangement structure of the door harness.

What is claimed is:

1. An arrangement structure of a door harness for a vehicle comprising:

a slide guide arranged within a vehicle door;

a harness protector of soft material which is slidably fit in the slide guide;

a first wire harness extending from a vehicle door through said harness protector;

a second wire harness extending from a vehicle body and to be coupled with the first wire harness;

a protector holder for holding the said harness protector; and a front pillar provided in the vehicle body, to which said harness protector is attached through said protector holder.

2. An arrangement structure of a door harness for a vehicle according to claim 1, further comprising:

a connector block arranged within said front pillar, a first connector for said first wire harness;

a second connector for said second wire harness, said first connector and said second connector being coupled with each other within said connector block.

3. An arrangement structure of a door harness for a vehicle according to claim 1, further comprising:

a first and a second door weather strip arranged between said vehicle door and said vehicle body, wherein said protector holder is located between said first and said second door weather strip.

4. An arrangement structure of a door harness for a vehicle according to claim 1, wherein said harness protector includes a protector body having a first hole through which said first wire harness passes, and guide walls which are formed at both sides of the harness protector body to extend in a direction of passing the first wire harness and have recesses formed at the one end thereof, respectively and said protector holder includes a holder body having a second hole through which said harness protector passes and protrusions which are formed on inner walls of the holder body and to be engaged with said recesses.

5. An arrangement structure of a door harness for a vehicle according to claim 1, wherein said protector holder includes a flange swelled on the side of the harness protector of said holder body and having an introducing hole for introducing said first wire harness to said second hole;

locking arms for locking said front pillar, which are formed on both sides of said holder body;

a water-proofing lip formed on the side of said holder body of the periphery of the said flange; and a first water-proofing wall uprighted on the periphery of said guide hole.

6. An arrangement structure of a door harness for a vehicle according to claim 5, wherein and said flange have drawing holes for drawing said locking arms, and second water-proofing walls uprighted from said flange of the periphery of each of said drawing holes.

7. An arrangement structure of a door harness for a vehicle according to claim 6, wherein said water-proofing lip, said first and second water-proofing walls are formed integrally said flange.

* * * * *